(12) United States Patent
Diapis et al.

(10) Patent No.: US 10,788,575 B1
(45) Date of Patent: Sep. 29, 2020

(54) AIR BASED SONAR PROJECTOR ARRAY

(71) Applicant: The United States of America as represented by the Secretary of the Navy, Newport, RI (US)

(72) Inventors: Jackeline D Diapis, North Kingstown, RI (US); Thomas A Frank, Richmond, RI (US); Lynn T Antonelli, Cranston, RI (US); Stephen C Butler, Portsmouth, RI (US)

(73) Assignee: The United States of America as represented by the Secretary of the Navy

( * ) Notice: Subject to any disclaimer, the term of this patent is extended or adjusted under 35 U.S.C. 154(b) by 0 days.

(21) Appl. No.: 16/744,281

(22) Filed: Jan. 16, 2020

(51) Int. Cl.
*G08B 23/00* (2006.01)
*G01S 7/521* (2006.01)

(52) U.S. Cl.
CPC ................................. *G01S 7/521* (2013.01)

(58) Field of Classification Search
CPC ................................. G08B 23/00; G01S 7/521
USPC ............... 340/517, 521, 540, 541, 635, 638; 367/88, 93, 106, 117, 128, 130
See application file for complete search history.

(56) References Cited

U.S. PATENT DOCUMENTS

| | | | |
|---|---|---|---|
| 9,213,099 B1 * | 12/2015 | Nielsen | G01S 15/003 |
| 9,693,148 B1 | 6/2017 | Lopez | |
| 2002/0064092 A1 * | 5/2002 | Nishimura | G01S 19/14 |
| | | | 367/128 |
| 2014/0165898 A1 * | 6/2014 | Cierpka | B63G 8/39 |
| | | | 114/312 |
| 2015/0192672 A1 * | 7/2015 | Doherty | G01S 15/96 |
| | | | 367/88 |
| 2016/0377716 A1 * | 12/2016 | Proctor | G01S 15/89 |
| | | | 367/88 |

\* cited by examiner

*Primary Examiner* — Tai T Nguyen
(74) *Attorney, Agent, or Firm* — James M. Kasischke; Michael P. Stanley

(57) ABSTRACT

Extendable air-based line arrays of directional projectors are provided with the arrays affixed and parallel to a ship hull. An anchor and a vibration isolator are affixed to the hull and the arrays in which the anchor and isolator separate the arrays from the hull. Each of hydraulically-actuated arms rotatably connect at a cam to an arm stop affixed to the anchor. A sound vibration dampener is positioned between the arm stops. The arms are capable of extending the directional projectors to an activation position with the projectors forming narrow beams into the water to become sonar waves that reflect from a target. The reflections from the target are received with a hydrophone on the ship.

4 Claims, 6 Drawing Sheets

AIR BASED SONAR PROJECTOR ARRAY

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION

1. Field of the Invention

The present invention relates to an air-based sonar projector and a method of use.

2. Description of the Prior Art

The speed of sound in air is approximately Ca=343 meters per second, while the speed of sound in water is approximately Cw=1500 meters/second. Thus, Cw/Ca=4.37 or Ca/Cw=0.2287. As such, the aperture length required to generate a beam in air is 0.2287 of the length required to generate a beam having the same angular width in water.

Snell's Law describes a refraction of sound waves in mediums that have differing velocities. In a medium consisting of layers with constant velocities; the angles of incidence of the wave at the layer boundaries are related to the sound velocity of each layer. The reflection transmission of a scrod wave impinging on the boundary layer between fluids with different impedances is: $\theta_i=\theta_1$=angle of incidence; $\theta_t=\theta_2$=angle of transmission and $\theta_r=\theta_3$=angle of reflection.

As shown in Equation (1), the angle of reflection is equal to the angle of incidence $$\theta_1=\theta_3. \quad (1)$$

The angle of incidence can vary depending on how the source of noise is positioned. The refractive index $\eta$ is calculated in Equation (2) as $$\frac{\sin\theta_1}{\sin\theta_2} = \frac{c_1}{c_2} = \eta \quad (2)$$

where $c_1$=speed of sound in air=1126 ft/s; $c_2$=speed of sound in water=4869 ft/s; and $\eta$=0.2312.

The critical angle $\theta_c$ for total internal reflection is determinable by Equation (3) as:

$$\theta_c = \sin^{-1}\frac{c_1}{c_2} = 13.371° \quad (3)$$

Based on the issues related to the refraction of sound waves in mediums that have differing velocities, a problem with existing sonar projectors is whether useful levels of acoustic energy can be transmitted from an in-air array into the water.

SUMMARY OF THE INVENTION

It is therefore a primary object and a general purpose of the present invention to provide an in-air array of directional projectors capable of transmitting useful amounts of acoustic energy into a water medium.

To attain the object of the present invention, a series of long range and air-based directional or sonar projectors are provided. Long range and air-based directional projectors are well-known to those skilled in the art.

Each series of the sonar projectors are movably affixed on a hull of a ship. Movable hydraulic arms are used for directing acoustic output and transmission toward an undersea target. Actuators for hydraulic arms for at-sea use are well-known in the art. By using a directional projector, acoustic energy can be targeted and transmitted into the water by narrow beams with a small aperture such that coverage is maximized.

Also, by using directional projectors such as positioned on a static or retractable line array; the projectors can conform to the ship hull. Because the directional projectors can be placed on or around the hull; the positioning of the projectors would not interfere with existing equipment mounted on a bow of the ship.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
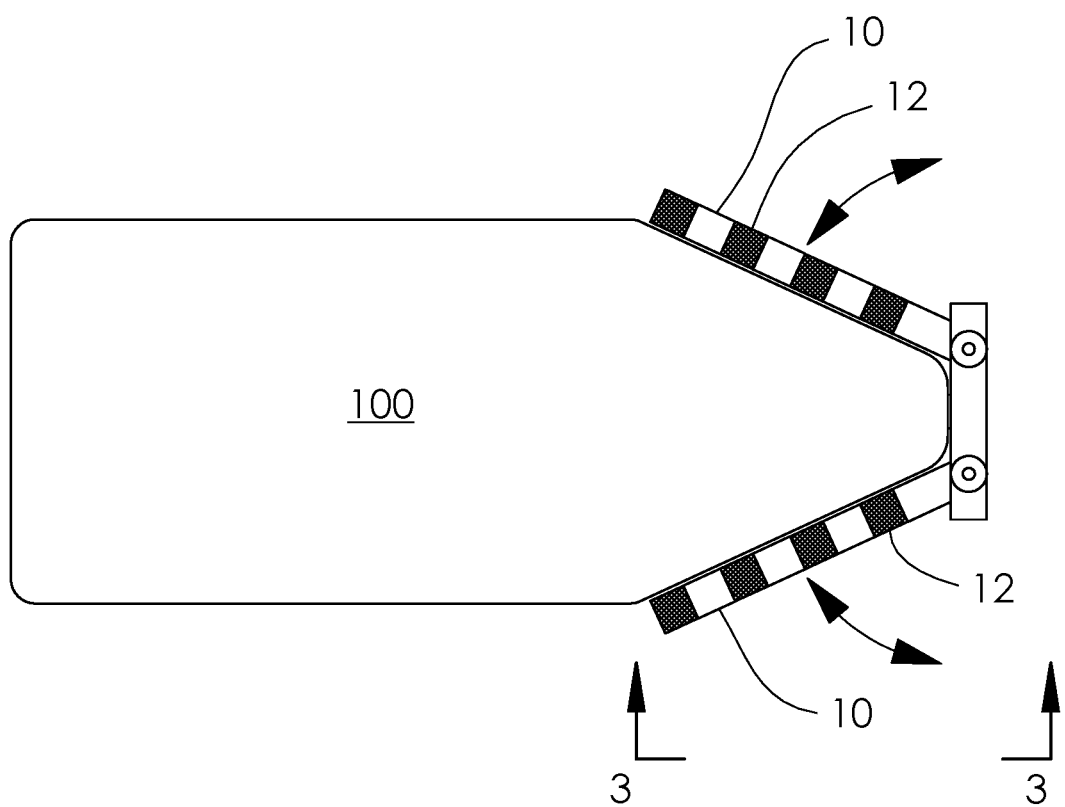
FIG. 1 depicts a plan view of two array sets of directional projectors of the present invention with each array set movable affixed to a hull of a ship and with the directional projectors in a stowed position.

Referring now to the drawings, FIG. 1-FIG. 4 depict a pair of air-based line array assemblies 10 of the present invention with the line array assemblies movable affixed to a hull of a ship 100. The array assemblies 10 are shown in the figures in a stowed and an operational position. The array assemblies 10, when stowed, can curve to conform with the hull of the ship 100.

The array assemblies 10 can also be straight to be offset from the hull of the ship. In both arrangements, simple fixtures and vibration isolators are used as part of the movable positioning of the array assemblies 10 on the hull of the ship 100. The line assembly 10 can also be mounted on an air platform.

Figure 5:
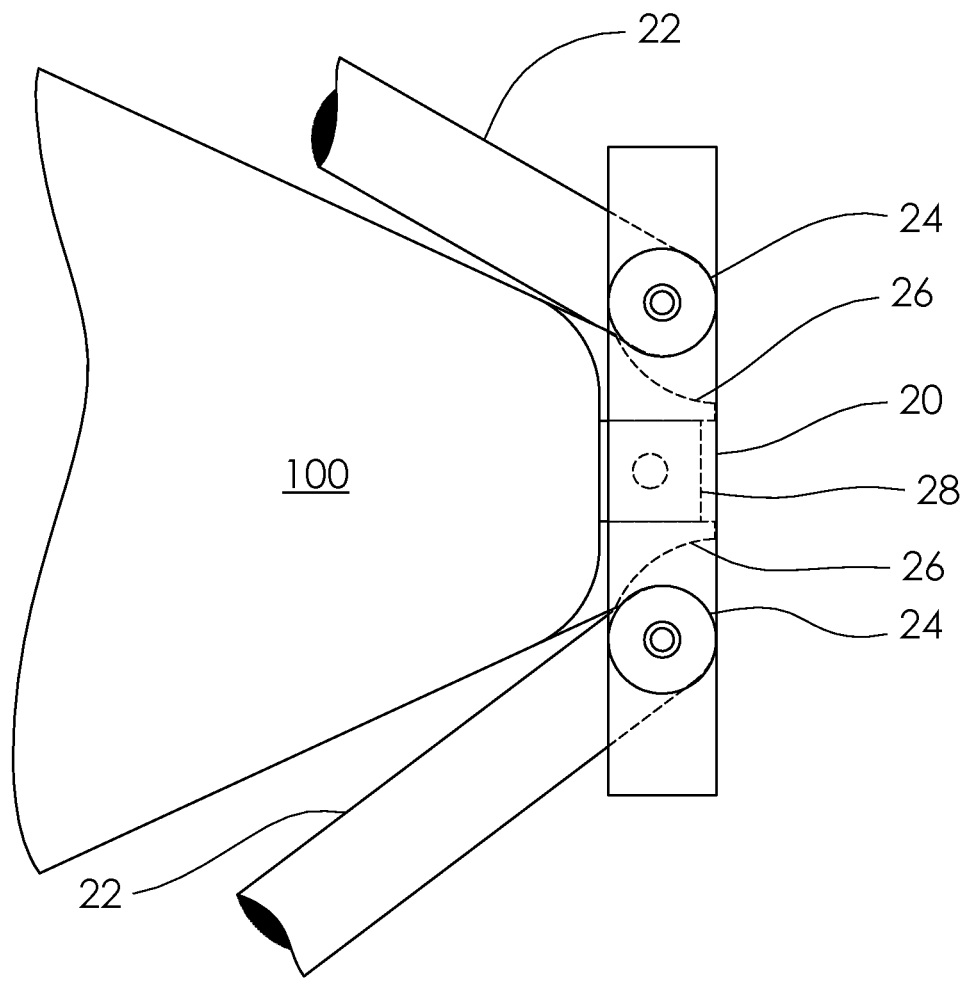
FIG. 5 depicts a detail view of an anchor plate for the arrays of directional projectors.

In further detail, FIG. 5 depicts an anchor 20 for the array assemblies 10. The anchor 20 is welded or otherwise affixed to the ship 100. Hydraulically-actuated arms 22 rotatably connect to an underside of the anchor 20 at a cam 24 of the arms. The hydraulically retractable arms 22 are pivotable at bearing joints 24.

Figure 6:
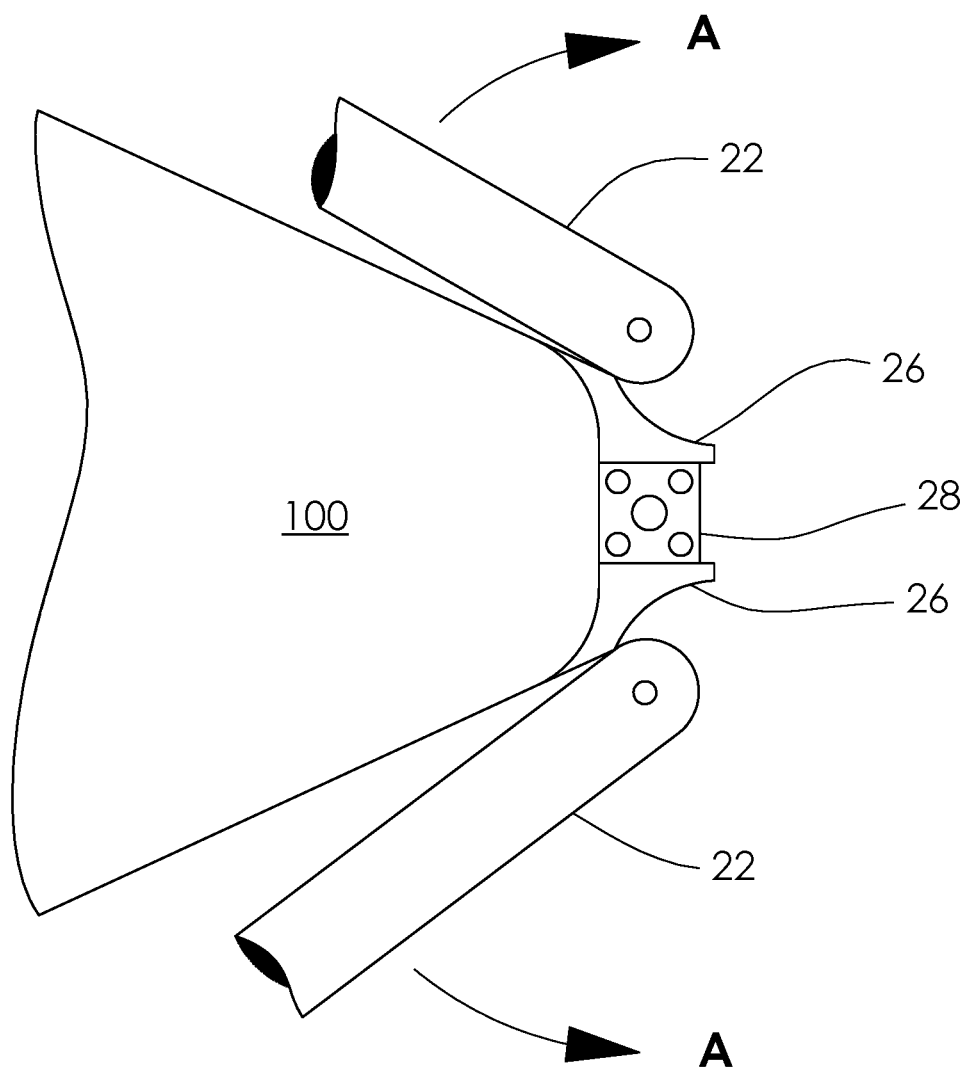
FIG. 6 depicts a detail view of arm stops and a vibration dampener for the arrays of directional projectors.

As shown in FIG. 6, each cam 24 is capable of rotating on an arm stop 26 affixed to the ship 100. Each arm stop 26 is curved to align with the cam 24 of each hydraulically-actuated arm 22. A sound absorber/vibration dampener 28 is positioned between the arm stops 26. Alternately, the arm stop 26 can be solely affixed to the anchor 20.

Figure 2:
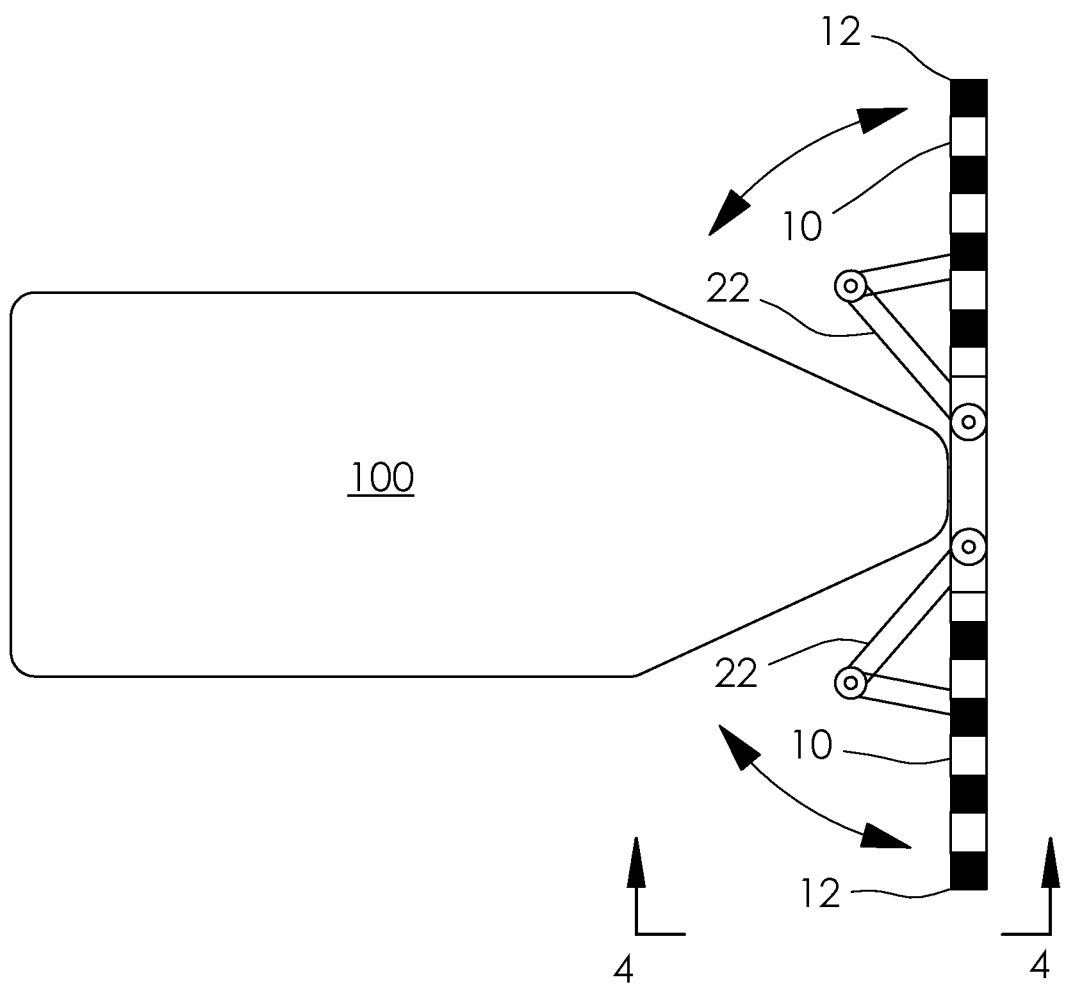
FIG. 2 depicts a plan view of two array sets of directional projectors with each array set movable affixed to a hull of a ship and with the directional projectors in an extended position for activation.
Figure 3:
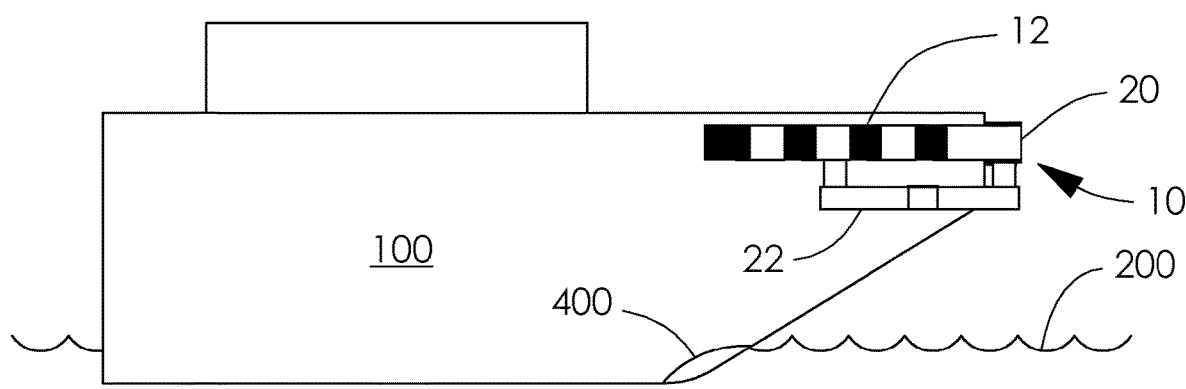
FIG. 3 depicts a side view of an array of directional projectors in a stowed position with the view taken along reference lines 3-3 of FIG. 1.

In operation, the arms 22 extend directional projectors 12 in direction "A" to an activation position shown in FIG. 2. As shown in the side view of FIG. 4, the directional projectors 12 form a succession of narrow beams in air which expand away at a separation angle. The narrow beams transmit in direction "B" into the water 200 to reflect from a target 300. The reflections in direction "C" from the target 300 are then received with either a single hydrophone 400 (if no vertical aperture is required) or a vertical line array (if a vertical aperture is required). The vertical line array is not shown.

Each directional projector 12 generates beams in air at a small angle $\theta_1$ relative to vertical. For example, when $\theta_1$ is 10 degrees; the transmitted angle $\theta_2$ is 49 degrees.

Figure 4:
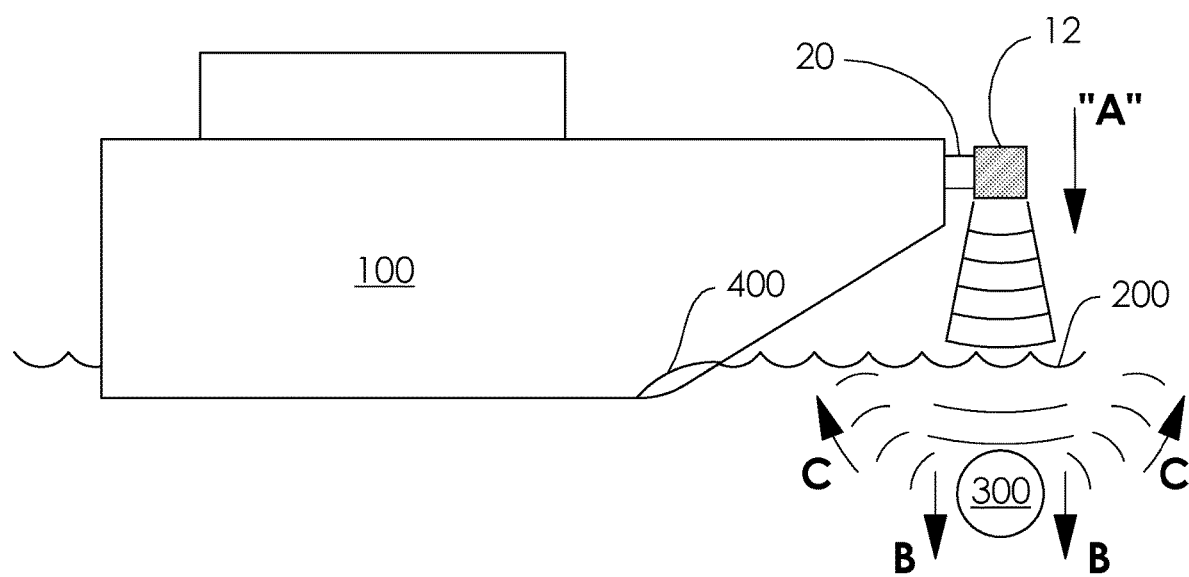
FIG. 4 depicts a side view of an array of directional projectors in an extended and active position with the view taken along reference lines 4-4 of FIG. 2.

In FIG. 4, the sound that is transmitted into the water 200 in direction "A". The sound enters the water and proceeds as sonar waves in direction "B". The sonar waves propagate until the acoustics are reflected from a target 300 in direction "C". The reflected acoustics are then sensed by a hull-mounted hydrophone 400. The succession of beams could encounter azimuth angles representing the area in front of the ship 100.

It will be understood that many additional changes in the details, materials, steps and arrangement of parts, which have been herein described and illustrated in order to explain the nature of the invention, may be made by those skilled in the art within the principle and scope of the expressed in the appended claims.

What is claimed is:

1. A directional acoustic projection assembly for mounting to a hull of a ship, said assembly comprising:
    an anchor plate extending from a bow of the ship at a first edge of said anchor plate and with said anchor plate having a first face and a second face with at least two arm stops such that each of said arm stops extends from a second edge and a third edge with both edges perpendicular to the first edge and with each of said arm stops having a curved insert on a side of said arm stop away from said anchor plate;
    a vibration isolator having a first face and a second face with the first face of said vibration isolator plate affixed to the first face of said anchor plate, wherein said vibration isolator is positioned between the arm stops;
    at least two hydraulically-actuated arms with each said arm having a cam at a first end for rotatably connecting within a curved insert of said arm stop and with each of said hydraulically-actuated arms is configured of folding by the rotation to a stowed position and extending to an acoustic projection position; and
    at least two line arrays of directional acoustic projectors with each line array positioned on each of said hydraulically-actuated arms such that said acoustic projectors are being configured to:
        projecting a succession of narrow acoustic beams from the directional acoustic projectors to a water surface;
        submerging the acoustic beams under the water surface and into the water, reflecting the acoustic beams from the submerged target; and
    receiving the reflected acoustic beams with a hydrophone mounted on the hull of the ship.

2. The assembly in accordance with claim 1 wherein each of said arm stops is solely affixed to said anchor plate.

3. A method of directional projection of acoustic waves from an air-based position on a ship to locate a submerged target, said method comprising steps of:
    providing an anchor plate extending from a bow of the ship at a first edge of said anchor plate and with said anchor plate having a first face and a second face with at least two arm stops such that each of said arm stops extends from a second edge and a third edge with both edges perpendicular to the first edge and with each of said arm stops having a curved insert on a side of said arm stop away from said anchor plate;
    providing a vibration isolator having a first face and a second face with the first face of said vibration isolator relate affixed to the first face of said anchor relate, wherein said vibration isolator is positioned between the arm stops;
    providing at least two hydraulically-actuated arms with each said arm having a cam at a first end for rotatably connecting within a curved insert of said arm stop and with each of said hydraulically-actuated arms is configured of folding by the rotation to a stowed position and extending to an acoustic projection position;
    providing a plurality of directional acoustic projectors on said hydraulically-actuated arms, said hydraulically-actuated arms rotatably affixed to the ship;
    extending the hydraulically-actuated arms to an activation position;
    projecting a succession of narrow acoustic beams from the directional acoustic projectors to a water surface;
    submerging the acoustic beams under the water surface and into the water;
    reflecting the acoustic beams from the submerged target; and
    receiving the reflected acoustic beams with a hydrophone mounted on the hull of the ship.

4. The method in accordance with claim 3, wherein said projecting step generates beams in aft at a small angle relative to vertical.

* * * * *